United States Patent [19]
La Custa

[11] 4,062,101
[45] Dec. 13, 1977

[54] METHOD AND TOOL FOR ASSEMBLING AN IMPACT RESISTANT GASOLINE TANK

[75] Inventor: Mike La Custa, Ferndale, Mich.

[73] Assignee: Chrysler Corporation, Highland Park, Mich.

[21] Appl. No.: 734,905

[22] Filed: Oct. 22, 1976

[51] Int. Cl.² .................. B23P 11/02; B23P 19/02
[52] U.S. Cl. ................................. 29/451; 29/235; 81/424
[58] Field of Search ............... 29/451, 235; 81/420, 81/424, 426

[56] References Cited
U.S. PATENT DOCUMENTS

| | | | |
|---|---|---|---|
| 604,079 | 5/1898 | Record | 81/420 X |
| 2,466,952 | 4/1949 | Jakubowski | 29/235 |
| 2,679,775 | 6/1954 | Fleming | 81/420 X |
| 2,996,796 | 8/1961 | Self | 29/235 |
| 3,017,692 | 1/1962 | Burnell | 29/235 X |
| 3,090,115 | 5/1963 | Carr | 29/235 X |
| 3,233,313 | 2/1966 | Roth | 29/450 UX |
| 3,455,011 | 7/1969 | Harding | 29/235 |

Primary Examiner—Charlie T. Moon
Attorney, Agent, or Firm—Baldwin & Newtson

[57] ABSTRACT

A tool and method of using the same are provided for installing a resiliently deformable crash resistant seal between an automobile gasoline tank and filler tube, whereby the filler tube may freely slide axially with respect to the seal without disrupting the latter or rupturing any fixed connection between the tank, tube, and seal.

8 Claims, 7 Drawing Figures

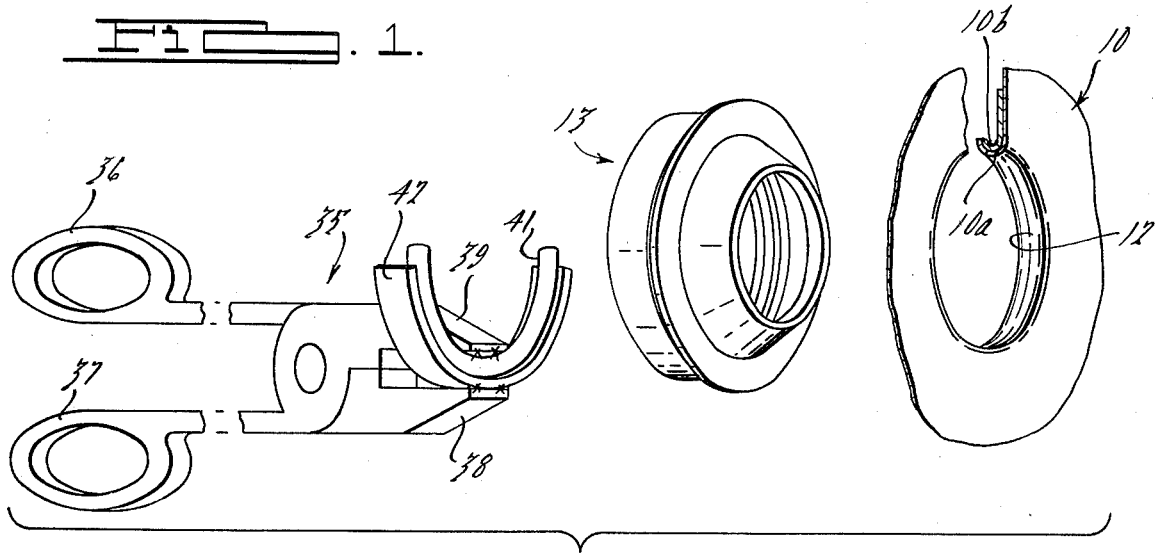
FIG. 1.
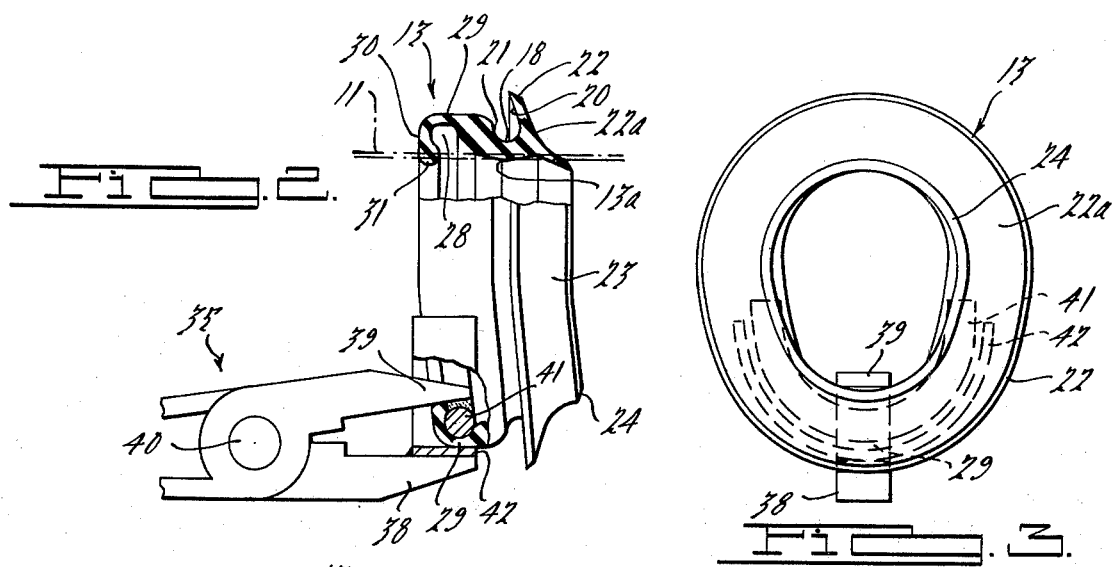
FIG. 2.
FIG. 3.
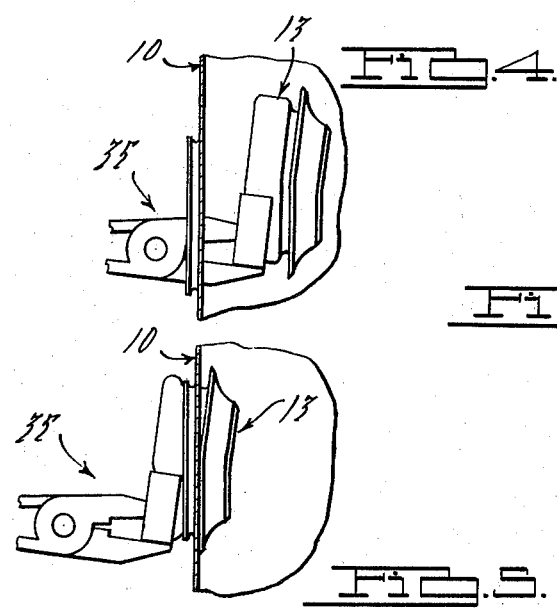
FIG. 4.
FIG. 5.
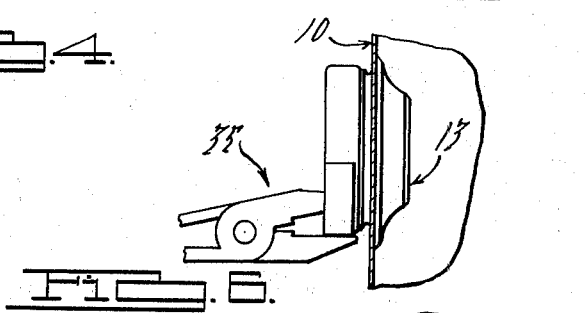
FIG. 6.
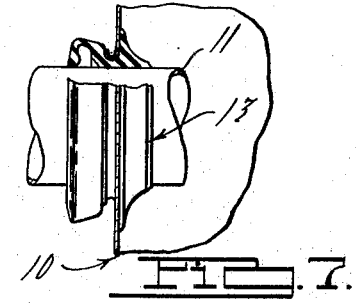
FIG. 7.

METHOD AND TOOL FOR ASSEMBLING AN IMPACT RESISTANT GASOLINE TANK

BACKGROUND AND SUMMARY OF THE INVENTION

In a conventional automobile construction, a filler tube extends through an opening in the fuel tank. A resiliently deformable annular seal is provided around the tube between the latter and the tank. Although the seal is deformable, it is comparatively stiff and uncompressible and is provided with an interference fit between the tube and tank that makes its assembly difficult.

An object of the invention is to provide an improved method for assemblying the seal with the tube and tank wherein the seal is assembled first with the tank and thereafter the filler tube is forced coaxially through the annular seal, thereby to compact the seal radially between the tube and tank to effect the desired sealing engagement.

The seal for which the tool is provided is described in more detail in copending application Ser. No. 715,962, filed Aug. 19, 1976, and is specifically designed to be highly resistant to leakage in the event of deformation of the tube or tank or relative displacement therebetween resulting from collision, especailly a rear end collision at impact speeds up to 30 miles per hour.

Specifically the seal comprising an annular body of resiliently deformable material. When assembled with the tube and tank, the radially inner and outer circumferential portions of the body are deformed and clamped respectively in fluid sealing relationship between the tube and the edge of the tank that defines the tank opening through which the tube extends. The minimum diameter of an inner circumferential portion of the seal body in its undeformed condition is less then the outer diameter of the tube. The diameter of the outer circumferential portion of the undeformed body overlying the aforesaid minimum inner diameter is greater than the diameter of the tank opening and defines the base of a radially outwardly opening annular sealing groove coaxial with the body and having the edge of the tank opening confined therein. Thus the radially inner and outer annular portions of the deformable body are resiliently deformed and pressed toward each other between the tube and tank to effect the seal.

The aforesaid annular sealing groove is defined by axially spaced interior and exterior sides, the interior side extending radially outwardly beyond the exterior side and being inclined toward the latter in the undeformed condition to effect an annular radial seal having an interference fit with the interior wall of the tank around said opening. Also extending into the tank around the tube from the radial seal is a tubular seal of endwise decreasing diameter in the undeformed condition less than the external diameter of the tube to effect an interference fit and sealing engagement therewith. The tubular and radial seals comprise two sealing areas and are sufficiently thin and flexible to yield readily against the tube and interior wall of the tank respectively when subject to the fluid pressure in the tank, thereby to increase the sealing engagement as the fluid pressure increases.

The annular body of the seal also comprises an annular radially inwardly opening fuel entrapping groove or channel located axially outwardly of the sealing groove. The latter channel is defined by an annular channel base having an outer radius smaller than the outer radius of the aforesaid interior radial seal and axially spacing the annular sides of the latter channel, which sides terminate radially inwardly in sealing engagement with the filler tube when assembled therewith.

Another object of this invention is to provide a tool to facilitate the assembly of the seal with the tank by gripping a peripheral edge portion of the seal which after assembly will be located exteriorly of the tank. The tool has radially outer and inner jaws arranged to grip a section of the base of the fuel entrapping channel. When in use, the jaws extend axially from the exterior of the annular seal to a clamping position whereat a clamping portion of the radially outer jaw engages the radially outer surface of said section. The radially inner jaw has a clamping portion that extends radially outwardly into the fuel entrapping channel toward the radially inner surface of the channel base to engage the aforesaid section thereof in opposition to the radially outer jaw. The tool also comprises handle means selectively operative from the exterior of the seal and tank to clamp the jaws radially toward each other in a clamping action to grip said channel base section therebetween, or to separate the jaws radially for withdrawal from the fuel entrapping channel.

Another object is to provide a method of using the tool for assemblying the seal with the tank prior to assemblying the filler tube comprising first gripping said peripheral edge portion of the seal, i.e., the section of the base of the fuel entrapping channel, then forcing the body of the annular seal edgewise, i.e., transversely of its principal axis, into the fuel tank and completely through the tank opening. Thereafter, while retaining the tool's grip on the base section, the latter is pulled by the tool outwardly from the tank and radially toward an edge portion of the tank opening until the latter edge portion is seated within the sealing groove. The outward pull on the seal is coupled with a twisting motion, whereby the portion of the fuel entrapping groove diametrically opposite the gripped section is cocked or pivoted outwardly of the tank opening about the aforesaid edge portion until the entire annular edge of the opening is seated within the sealing groove and the interior radial seal is sealed against the interior of the fuel tank.

Although the material of the seal is deformable, its thicker portions are also tough and difficult to stretch or bend. Accordingly the seal is preferably dipped in lubricating oil before being inserted through the tank opening. Only the comparatively thin peripheral edges of the annular interior seal or the correspondingly thin interior portion of the tubular seal flex readily under the influence of the fuel pressure within the tank. Except for the lubricating oil, the tool need not be provided with auxiliary means for pushing the seal into the tank or for pulling the exterior channel outwardly through the tank opening in the final stages of assembly of the seal and tank.

When the yieldable seal material is sufficiently resistant to deformation or the interference sealing engagements effect an exceptionally tight fit between the seal and tank, the clamping portions of the outer and inner jaws may comprise radially outer and inner U-shaped or oval clamping members respectively for gripping the base of the exterior channel over an appreciable portion but less than one half of its circumference. In such a situation the inner oval clamping member enters the exterior channel and engages both the base and the axially outer side of the latter. Thus the force of the outward pull and twisting motion on the seal is distributed over a large peripheral portion of the exterior channel. The oval shape of the clamping members is dimensioned so that the clamped seal is distorted to an oval shape having a long diameter and a short diameter, whereby the clamped seal may be inserted edgewise in the direction of the long diameter into the tank through its opening.

Other objects of this invention will appear in the following description and appended claims, reference being had to the accompanying drawings forming a part of this specification wherein like reference characters designate corresponding parts in the several views.

FIG. 1 is a fragmentary view of the tool embodying the present invention, preparatory to gripping the annular seal and forcing it through the filler tube opening in a portion of the fuel tank.

FIG. 2 is a side view partially in section showing the seal gripped by the jaws of the tool.

FIG. 3 is a view taken from the interior side of the seal of FIG. 2.

FIG. 4 is a reduced side view similar to FIG. 3, showing the seal inserted by the tool completely through the tank opening.

FIG. 5 is a view similar to FIG. 4, showing the seal partially assembled with the tank.

FIG. 6 is a view similar to FIG. 5, showing the seal completely assembled with the tank, prior to removal of the tool.

FIG. 7 is a view similar to FIG. 6, showing the filler tube inserted coaxially through the annular seal.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENT

Referring to the drawings, FIG. 1 shows a fragment of an automobile gasoline tank 10 prior to assembly with a filler tube 11, FIG. 7 and phantom view, FIG. 2. In the present instance the tank 10 is provided with a circular opening 12 defined and reinforced by an annular flange 10a adapted to seat in fluid sealing engagement within a sealing groove of a seal 13. The latter in its undeformed condition is illustrated in FIG. 1 and comprises an annular body of resiliently deformable elastomeric material having a radially outwardly opening annular sealing groove 18 in its outer periphery, FIG. 2, for receiving the flange 10a. The latter is rounded to increase the rigidity of the edge of the opening 12 and may be suitably reinforced by an annular ring or grommet 10b conforming to the shape of the flange 10a and secured thereto. The groove 18 has an undeformed minimum diameter greater than the minimum inner diameter of the annular flange 10a to effect an interference fit and fluid sealing engagement between these parts when assembled.

Radially inwardly of the minimum diameter of the base of groove 18, the undeformed diameter of the seal 13 at 13a is somewhat less than the outer diameter of the tube 11 to effect an interference fit and sealing engagement therewith in the assembled condition. From the region 13a, the inner diameter of the seal 13 enlarges in both axial directions so that a localized concentration of compressive force is exerted on the seal 13 in the assembled condition at the base of the groove 18 to effect optimum sealing and at the same time to facilitate assembly of the seal 13 with the tank 10 and tube 11 without recourse to undue force that would otherwise be required if the body of the seal 13 had a uniform small internal diameter.

The groove 18 is defined by axially spaced annular interior and exterior sides or seals 20 and 21 respectively. The interior side 20 is adapted to conform to the interior of the tank 10 around the opening 12 and converges axially and radially outwardly toward the exterior wall 21 in the undeformed condition. Thus when assembled, the interior side 20 lies flush in fluid sealing engagement with the interior wall of the tank 10 at an interference fit and comprises an annular seal that extends radially outwardly beyond the side 21 for a distance approximately equal to the latter's radial dimension. The annular seal 20 is also sufficiently thin axially and flexible to be readily urged by the fluid pressure in the tank 10 against the latter's interior wall around the opening 12, thereby to conform closely to the interior of the tank 10 and increase the sealing effectiveness. In this regard, the flexibility of the outer periphery of the seal 20 is increased by the chamfer 22.

The rightward or interior end of the annular body of the seal 13 comprises a thin flexible tubular seal 23 adapted when assembled to extend in fluid sealing engagement with the outer periphery of the tube 11 at an interference fit. The thickness and axial length of the seal 23 is comparable to the thickness and radial length of the seal 20. The internal diameter of the seal 23 decreases axially endwise in the undeformed condition from a maximum that is approximately equal to the external diameter of the tube 11 to a minimum at its interior end somewhat less than the minimum diameter of the sealing region 13a. Also similarly to the seal 20, the seal 23 is sufficiently flexible to yield readily against the tube 11 when subject to the fluid pressure in the tank 10, thereby to increase the sealing engagement between the seal 23 and tube 11 as the fluid pressure exerted against the seal 23 increases. The axial end of the seal 23 is also chamfered at 24 to increase its flexibility and sealing effectiveness.

Axially outward of the side 21, the annular body of the seal 13 is provided with a radially inwardly opening annular fuel entrapping channel 28 having a comparatively thin flexible base 29 and an annular endwall 30 which extends radially inwardly in the non-deformed condition to a smaller diameter than the exterior diameter of the tube 11 to effect an interference fit and sealing engagement therewith. The wall 30 terminates radially inwardly in an annular enlargement 31 rounded in cross-section at the region which engages tube 11. Thus in the event of an impact and a momentary leakage of fuel through the tubular seal 23 and sealing region 13a, fuel will be trapped within the channel 28. If the leakage is not excessive, the fuel entrapped within the channel 28 will be absorbed in part by the body of the seal 13 and will thereafter be gradually dissipated to the atmosphere by leakage in a vapor phase.

By virtue of the structure described, in the event of a collision, the tube 11 can slide axially along the seals 31, 23 and 13a without disrupting the same or rupturing any fixed connection with the tank 10. Likewise the tube 11 may be cocked to an appreciable extent angularly with respect to its normal axis without causing leakage. In such an event the annular body of the seal 13 at either axial side of its thickest and most rigid portion in the plane of the annular restriction 13a is readily deformable to conform to the angularly cocked tube 11 without unduly deforming the tank 10 or disrupting the seal effected at 18 and 20. In the latter regard, the reinforcing flange or rim 10a and ring or grommet 10b prevent excessive deformation of the thin metal of the tank 10 around the opening 12, which deformation would allow leakage at the sealing surfaces 18 and 20 at high tank pressures.

Also the present construction facilitates assembly by reason of (a) the shallow annular interiorly opening channel 22a of arcuate longitudinal section, FIG. 2, connecting the chamfered ends 22 and 24, (b) the seal 20 inclined toward the wall 21, and (c) the exterior channel 28. A section of the base 29 of the latter channel 28 can be readily clamped by a tool prior to assembly of the seal 13 with either the tube 11 or tank 10, whereby the seal may then be forced edgewise, i.e., transversely to its major annular axis, completely through the opening 12 into the tank 10. The arcuate portion 22a between the chamfers 22 and 24 facilitates camming of the deformable seal to an out-of-around condition as it passes interiorly through the opening 12, and the outwardly inclined seal 20 readily yields outwardly as the seal 13 is forced into the tank 10. Thereafter the channel 28 may be pulled outwardly through the opening 12 until the flange 10a seats within the groove 18.

The outwardly inclined seal 20 readily yields outwardly to a limited extent as aforesaid to facilitate insertion of the seal 13 into the tank 10 through the opening 12, but when an outward pull is thereafter exerted on the seal 13 by an outward pull on the channel base 29 and wall 30, the seal 20 will only yield readily a limited extent inwardly and away from the wall 21 until the flange 10a seats within the groove 18. Thereafter the seal 20 effectively resists further inward yielding. The tube 11 may then be inserted through the central opening of the seal 13 to complete the assembly.

The tool 35 for carrying out the above described assembly comprises a tong-like device having paired handles 36 and 37 integral with jaws 38 and 39 respectively and pivotally connected at 40, such that when the handles 36 and 37 are moved toward and from each other, the jaws 38 and 39 move similarly. The lower surface of the upper jaw 39 is welded to the upper concave surface of the base of a U-shaped clamp 41 of circular cross section dimensions to fit closely within the channel 28 and grip its base 29, FIG. 2. The upper surface of the lower jaw 38 is welded to the convex surface of a similar U-shaped clamp 42 of rectangular cross section dimensioned to grip the exterior of the base 29 in opposition to clamp 41 when the handles 36, 37 are forced toward each other.

The distances between the upper ends of the U-shaped clamp 41 and the corresponding distance between the upper ends of the clamp 42 are dimensioned to elongate the annular seal 13 in the direction of the major axis of the U-shaped clamps 41 and 42, and correspondingly to reduce the diameter of the seal 13 transversely of the latter axis, as illustrated in FIG. 3, when the channel base 29 is gripped tightly between the clamps 41 and 42. Thus insertion of the body 13 through the opening 12, with the jaws 38 and 39 foremost and with the major axes of the U-shaped clamps 41 and 42 inclined outwardly from the tank 10 is facilitated.

In carrying out the operation of the assemblying the seal 13 with the fuel tank 10, the outer edge of the seal 31 is clamped as illustrated in FIG. 2, with the base 29 of channel 28 gripped between the clamps 41 and 42. The body 13 may then be dipped into a lubricating oil to facilitate its passage through the opening 12. Thereafter the jaws 38 and 39 with the seal 13 tightly gripped by the clamps 41 and 42 are forced generally endwise, i.e., lengthwise of the tool 35 in the direction from the handles 36,37 to the jaws 38,39 through the central portion of the opening 12.

The yieldable body 13 in the elongated condition of FIG. 3 will thus be cammed rearwardly from the leading ends of the jaws 38,39 by engagement between the concave surface 22a and the edge of the opening 12. In this action, the flexible seal 13 will be elongated additionally as it is forced through the opening 12 and the annular seal 20 will be cammed outwardly toward the side 21, i.e., rearwardly with respect to the direction of movement of the tool 35. Also in this action, as the seal 13 passes through the opening 12, the jaws 38,39 are forced forwardly and downwardly.

As soon as the seal 13 passes completely through the opening 12, FIG. 4, the seal 13 will resume the shape illustrated in FIG. 3 and the portion of the tool 35 within the opening 12 will be near the latter's lower edge. Thereafter, while still gripping the base 29 as before, the tool 35 is pulled rearwardly or outwardly from the opening 12 until the latter's lower edge seats within the groove 18. Continued outward pull on the portion of the base 29 and wall 30 of the groove 28 will be resisted by the seal 20 engaging the interior surface of the tank 10 around the opening 12, causing the yieldable material of the seal 13 to stretch until the entire edge 10a of the opening 12 is seated within the groove 18, FIG. 6.

In the above described action, the rearward handle portion of the tool 35 may be pressed downward to effect a cocking action urging the upper portion of the seal 13 rearwardly or outwardly of the tank 10 to enhance the force of the outward pull by the clamps 41,42 on the lower portion of the body 13. Thus seating of the entire edge 10a within the groove 18 is facilitated to assure complete withdrawal of the channel 28 and tool 35 from the tank 10. The jaws 38,39 are then opened and the clamps 41,42 are removed from the channel 28. The assembly is completed by inserting the filler pipe 11 coaxially through the annular seal body 13.

As illustrated in FIG. 2, the cross sectional diameter of the clamp 41 is approximately equal to the radial extent of wall 30, so that when the jaws 38,39 are closed in a clamping action, the clamp 41 will substantially fill the channel 28 and engage the base 29 and endwall 30 without causing undue crushing of the bead 31. In this regard the U-shaped clamps 41,42 are preferred where the material of the seal 13 is sufficiently rigid to require the deforming action of the U-arms to elongate the seal 13 to the FIG. 3 shape prior to its insertion through the opening 10. Also the U-clamps 41 and 42 engaging a substantial circumferential section of the base 29 and side 30 enhance the above described cocking or twisting action that facilitates the final outward movement of the upper portion of the seal 13 and seating of the upper portion of the edge 10a within the groove 18 after the lower portion of the edge 10a has been similarly seated.

If the interference fit between the seal 13 and edge 10a is not too tight, the arms of the U-shaped clamps 41,42 may be materially shortened to such an extent that they do not extend laterally beyond their respective jaws 38 and 39. The clamping and pulling action on the base 29 and end wall 30 as described to assemble the seal 13 and tank 10 will be the same in any event.

I claim:

1. In a method for assemblying an annular body of resiliently deformable material within a circular opening of an automobile fuel tank to provide a seal between said tank and a filler tube slidably axially within said body without destroying the seal, said body having an annular radially outwardly opening sealing groove therein for containing in fluid sealing relationship an annular edge of said tank defining said opening, said groove being defined by axially spaced interior and exterior annular sides, the outer radius of said interior annular side being greater than the outer radius of said exterior annular side, the surface of said interior side confronting said exterior side being engageable with the interior of said tank around said opening in fluid sealing relationship when said seal, tank, and tube are assembled, said body having a tubular sealing portion extending interiorly from said interior side and engageable with the outer periphery of said filler tube in fluid sealing relationship within said tank when said seal, tank, and tube are assembled, said body having an annular radially inwardly opening channel located exteriorly of said radially outwardly opening groove and defined by axially spaced annular sides engageable at their inner peripheries with said outer periphery of said filler tube in fluid sealing relationship exteriorly of said tank when the said seal, tank, and tube are assembled, the last named sides being spaced axially by an annular base of said radially inwardly opening channel having an outer radius less than the outer radius of said interior side, the steps of gripping said body adjacent a peripheral edge portion thereof exteriorly of said exterior side and forcing said resiliently deformable body edgewise and inwardly completely through said opening by deforming said body, thereafter pulling said edge portion of said body outwardly completely through said opening adjacent in edge portion of the latter to force the last named edge portion into said sealing groove and to force the juxtaposed portion of said interior side against the adjacent interior of said tank, thereafter forcing said annular edge of said opening into said sealing groove entirely around said opening and forcing said annular interior side against the interior of said tank entirely around said opening by continuing said pulling on said edge portion of said body to deform and elongate the latter axially until said base of said inwardly opening channel is pulled completely outwardly through said opening.

2. In the method according to claim 1, the step of providing a tool having radially inner and outer jaws, each having a clamping portion for clamping a section of the base of said inwardly opening channel therebetween, said gripping comprising clamping said section radially between said jaws, said forcing inwardly comprising pushing said jaws completely through said opening with said section clamped between said jaws and with said body following said jaws edgewise, said pulling comprising pulling said jaws outwardly through said opening with said section clamped therebetween and ahead of the major portion of said body.

3. In the method according to claim 2, dipping said body into a lubricant prior to said forcing to facilitate the latter.

4. In the method according to claim 3, said pulling also comprising pulling said jaws toward an edge of said opening as well as outwardly and thereafter pulling said jaws outwardly through said opening from adjacent said edge until the latter is sealed within an adjacent portion of said sealing groove.

5. In the method according to claim 4, said pulling also comprising cocking said tool and the gripped portion of said body as said edge enters said adjacent portion of said sealing groove to urge the diametrically opposite portion of said body outwardly from said tank.

6. In the method according to claim 5, the clamping portion of said inner jaw being dimensioned to substantially fill said channel at the region of said base and to engage said base and the axially outer side of said channel at said region, and said pulling comprising pulling said base and outer side at said region outwardly through said opening from adjacent said edge.

7. In the method according to claim 6, each clamping portion comprising a U-shaped member secured at the U-base to its respective jaw and having the ends of its U-arms remote from the U-base spaced a distance less than the diameter of the portion of said body gripped therebetween, said gripping comprising the elongation of said annular body by clamping said section of said base between said U-shaped members.

8. In a tool for assembling an annular body of resiliently deformable material within a circular opening of an automobile fuel tank to provide a seal between said tank and a filler tube slidably axially within said body without destroying the seal, said body having an annular radially outwardly opening sealing groove therein for containing in fluid sealing relationship an annular edge of said tank defining said opening; said groove being defined by axially spaced interior and exterior annular sides, the outer radius of said interior annular side being greater than the outer radius of said exterior annular side, the surface of said interior side confronting said exterior side being engageable with the interior of said tank around said opening in fluid sealing relationship when said seal, tank, and tube are assembled, said body having a tubular sealing portion extending interiorly from said interior side and engageable with the outer periphery of said filler tube in fluid sealing relationship within said tank when said seal, tank, and tube are assembled, said body having an annular radially inwardly opening channel located exteriorly of said radially outwardly opening groove and defined by axially spaced annular sides engageable at their inner peripheries with said outer periphery of said filler tube in fluid sealing relationship exteriorly of said tank when the said seal, tank, and tube are assembled, the last named sides being spaced axially by an annular base of said radially inwardly opening channel having an outer radius less than the outer radius of said interior side, said tool comprising raidally inner and outer jaws, said outer jaws having a clamping portion engageable with the radially outer surface of a section of said base, said inner jaw having a clamping portion extending radially outwardly toward the first named clamping portion for entering said channel and engaging the radially inner surface of said section in opposition to the first named clamping portion, and means for selectively operating said jaws to clamp said section firmly therebetween or for releasing the latter by withdrawing the radially outwardly extending portion of said inner jaw from said channel, said clamping portion of said inner jaw being dimensioned to engage the base and axially outer side of said channel, said clamping portions comprising a pair of interfitting U-shaped members dimensioned to clamp said section therebetween, each being secured at its U-base to its respective jaw, the ends of the U-arms of each U-shaped member remote from its associated U-base being spaced transversely of the axis of said annular body a distance less than the corresponding spacing of the undeformed portions of said section to be clamped by said ends when said jaws are operated to clamp said section, thereby to elongate said yieldable body when clamped between said clamping portions.

* * * * *